United States Patent
Migdal et al.

(10) Patent No.: US 6,549,288 B1
(45) Date of Patent: Apr. 15, 2003

(54) STRUCTURED-LIGHT, TRIANGULATION-BASED THREE-DIMENSIONAL DIGITIZER

(75) Inventors: Alexander Migdal, Princeton, NJ (US); Michael Petrov, Princeton, NJ (US); Alexei Lebedev, Princeton, NJ (US); Veronika Shelyekhova, Cranbury, NJ (US); Vadim Abadjev, Princeton, NJ (US); Vladimir Bernstein, East Windsor, NJ (US); Andrei Afanassenkov, East Windsor, NJ (US)

(73) Assignee: Viewpoint Corp., New York, NY (US)

( * ) Notice: Subject to any disclaimer, the term of this patent is extended or adjusted under 35 U.S.C. 154(b) by 0 days.

(21) Appl. No.: 09/312,447

(22) Filed: May 14, 1999

Related U.S. Application Data (60) Provisional application No. 60/085,489, filed on May 14, 1998.

(51) Int. Cl.[7] ............... G01B 11/30; G06K 9/00
(52) U.S. Cl. ............ 356/603; 350/602; 350/601; 382/154
(58) Field of Search ............ 356/601, 602, 356/603, 604, 605; 382/154; 250/237.2, 559.23

(56) References Cited

U.S. PATENT DOCUMENTS

| | | |
|---|---|---|
| 4,175,862 A | 11/1979 | DiMatteo et al. |
| 4,238,147 A | 12/1980 | Stern |

(List continued on next page.)

FOREIGN PATENT DOCUMENTS

| | | |
|---|---|---|
| CA | 1295039 | 1/1992 |
| CA | 1332633 | 10/1994 |
| EP | 0 632 349 A1 | 1/1995 |
| GB | 2 264 601 A | 9/1993 |
| GB | 2 264 602 A | 9/1993 |
| WO | WO 96/06325 | 2/1996 |

OTHER PUBLICATIONS

Hoppe, Hugues, "Surface Reconstruction from Unorganized Points," pp. 1–116, 1994.
Eck, Matthias et al., "Multiresolution Analysis of Arbitrary Meshes," 1995, pp. 1–25.
DeRose, Tony et al., "Fitting of Surfaces to Scattered Data," 1992, 6 pages.
Hoppe, Hugues, "Generation of 3D geometric models from unstructured 3D points," 4 pages.
Turk, Greg et al., "Zippered Polygon Meshes from Range Images," Jul. 1994, 4 pages.

(List continued on next page.)

*Primary Examiner*—Zandra Smith
(74) *Attorney, Agent, or Firm*—Kenyon & Kenyon (57) ABSTRACT

The present invention provides a system for illuminating an object with a special kind of structured light pattern, recording the shape of the reflected points of light by means of a camera, and, by a triangulation technique that does not depend on the fixed direction of the light source relative to the camera, reconstructing the 3D shape of the object through a computer using the data points collected from the reflection of the structured light pattern. The scanning system is portable and does not require data processing contemporaneous with the data collection. The portable system stores in the storage media several images of the objects with different illumination patterns. The data is subsequently processed, by a computer system which applies data processing routines, i.e., the model building algorithms which provide 3D surface generation. The data acquisition according to the present invention is simplified to acquiring of only two or, optionally, four images of the object, thereby significantly increasing the digitization speed over that of laser-based scanners. The light source projects both structured light and uniform illumination light from the same apparent source, and that allows for numerical normalization of the images.

22 Claims, 9 Drawing Sheets

U.S. PATENT DOCUMENTS

| | | |
|---|---|---|
| 4,297,034 A | 10/1981 | Ito et al. |
| 4,529,305 A | 7/1985 | Welford et al. |
| 4,529,316 A | 7/1985 | DiMatteo |
| 4,575,805 A | 3/1986 | Moermann et al. |
| 4,627,734 A | 12/1986 | Rioux |
| 4,645,347 A | 2/1987 | Rioux |
| 4,653,104 A | 3/1987 | Tamura |
| 4,705,401 A | 11/1987 | Addleman et al. |
| 4,737,032 A | 4/1988 | Addleman et al. |
| 4,794,262 A | 12/1988 | Sato et al. |
| 4,800,270 A | 1/1989 | Blais |
| 4,800,271 A | 1/1989 | Blais |
| 4,802,759 A * | 2/1989 | Matsumoto et al. ........ 356/602 |
| 4,825,263 A | 4/1989 | Desjardins et al. |
| 4,842,411 A * | 6/1989 | Wood .......................... 356/602 |
| 4,871,256 A | 10/1989 | Grindon |
| 4,948,258 A | 8/1990 | Caimi |
| 4,952,149 A | 8/1990 | Duret et al. |
| 4,961,155 A | 10/1990 | Ozeki et al. |
| 4,965,655 A | 10/1990 | Amir |
| 4,982,102 A | 1/1991 | Inoue et al. |
| 5,018,854 A | 5/1991 | Rioux |
| 5,027,281 A | 6/1991 | Rekow et al. |
| 5,030,008 A | 7/1991 | Scott et al. |
| 5,102,223 A | 4/1992 | Uesugi et al. |
| 5,102,224 A | 4/1992 | Uesugi et al. |
| 5,104,227 A | 4/1992 | Uesugi et al. |
| 5,127,061 A | 6/1992 | Amir et al. |
| 5,164,793 A | 11/1992 | Wolfersberger et al. |
| 5,177,556 A | 1/1993 | Rioux |
| 5,187,364 A | 2/1993 | Blais |
| 5,193,120 A | 3/1993 | Gamache et al. |
| 5,196,900 A | 3/1993 | Pettersen |
| 5,216,236 A | 6/1993 | Blais |
| 5,218,427 A | 6/1993 | Koch |
| 5,270,795 A | 12/1993 | Blais |
| 5,280,542 A | 1/1994 | Ozeki et al. |
| 5,303,386 A | 4/1994 | Fiasconaro |
| 5,305,092 A | 4/1994 | Mimura et al. |
| 5,345,490 A | 9/1994 | Finnigan et al. |
| 5,377,011 A | 12/1994 | Koch |
| 5,381,236 A | 1/1995 | Morgan |
| 5,381,526 A | 1/1995 | Ellson |
| 5,410,358 A | 4/1995 | Shackleton et al. |
| 5,416,591 A | 5/1995 | Yoshimura et al. |
| 5,418,608 A | 5/1995 | Caimi et al. |
| 5,424,835 A | 6/1995 | Cosnard et al. |
| 5,436,655 A | 7/1995 | Hiyamu et al. |
| 5,444,537 A | 8/1995 | Yoshimura et al. |
| 5,446,549 A | 8/1995 | Mazumder et al. |
| 5,465,323 A | 11/1995 | Mallet |
| 5,473,436 A | 12/1995 | Fukazawa |
| 5,481,483 A | 1/1996 | Ebenstein |
| 5,506,683 A | 4/1996 | Yang et al. |
| 5,509,090 A | 4/1996 | Maruyama et al. |
| 5,511,153 A | 4/1996 | Azurbayejani et al. |
| 5,513,276 A | 4/1996 | Theodoracalos |
| 5,528,737 A | 6/1996 | Starti |
| 5,589,942 A | 12/1996 | Gordon |
| 5,615,003 A | 3/1997 | Hemary et al. |
| 5,680,216 A | 10/1997 | Hierholzer et al. |
| 5,784,098 A | 7/1998 | Shoji et al. |
| 5,930,383 A * | 7/1999 | Netzer ........................ 382/154 |

OTHER PUBLICATIONS

Rioux, Marc et al., "White Laser, Syneed Scan," *IEEE Computer Graphics and Applications*, vol. 13, No. 3, pp. 15–17 May 1993.

Carlbom, Ingrid, et al., "Modeling and analysis of empirical data in collaborative environments" *Communications of the ACM*, vol. 35, No. 6, Jun. 1992, p. 74.

Jones, P.F. et al., "Comparison of three three–dimensional imaging systems," *J. Opt. Soc. Am. A*. vol. 11, No. 10, Oct. 1994, pp. 2613–2621.

Housler, Gerd et al., "Light sectioning with large depth and high resolution," *Applied Optics*, vol. 27, No. 24, Dec. 15, 1988, pp. 5165–5169.

Motamodi, M. Edward et al., "Miniaturized micro–optical scanners," *Optical Engineering*, vol. 33, No. 11, Nov. 1994, pp. 3616–3623.

Rioux, Marc et al., "Design of a large depth of view three–dimensional camera for robot vision," *Optical Engineering*, vol. 26, No. 12, Dec. 1987, pp. 1245–1250.

Treplt, Oliver et al., "Computer control for a galvanometer scanner in a confocal scanning laser microscope," *Optical Engineering*, vol. 33, No. 11, Nov. 1994, pp. 3774–3780.

Strand, T.C., "Optical three–dimensional sensing for machine vision," *Optical Engineering*, vol. 24, No. 1, Jan./Feb. 1985, pp. 033–040.

Busch, David D., "Getting the Picture," *Windows Sources*, Nov. 1995, pp. 114–136.

Marshall, G.F., "Scanner refinements inspire new uses", *Laser Focus World*, Jun. 1994, pp. 2–6.

Ludwiszewski, Alan, "Standards for Oscillatory Scanners," *Gerneal Scanning Inc.,* Feb. 1993, pp. 1–21.

Cyberware, "Corporate Backgrounder", copyright 1995.

* cited by examiner

STRUCTURED-LIGHT, TRIANGULATION-BASED THREE-DIMENSIONAL DIGITIZER

This application claims benefits of Provisional Application Ser No. 60/085,489 filed May 14, 1998.

FIELD OF THE INVENTION

This invention relates generally to a three-dimensional ("3D") measurement/digitization system and method, and in particular to a portable 3D digitization system and method which facilitate acquisition of data relating to 3D profiles of objects for subsequent computer-aided processing and reproduction of the 3D profiles of objects by shape digitizing.

BACKGROUND OF THE INVENTION

Speed, accuracy, and portability have been recurrent and difficult to achieve goals for devices that scan, measure or otherwise collect data about 3D objects for purposes such as reproduction. With the advent of computers, such devices have useful application in many fields, such as digital imaging, computer animation, topography, reconstructive and plastic surgery, dentistry, internal medicine, rapid prototyping, and other fields. These computer-aided systems obtain information about an object and then transform the shape, contour, color, and other information to a useful, digitized form.

The technology currently available for shape digitizing falls into two different but related groups: mechanical systems and optical systems. All systems within those two general categories struggle with the basic criteria of speed, accuracy, portability and ability to digitize the color texture image of an object.

A mechanical system acquires data about an object through the use of a probe that has a sensitive tip. The mechanical system scans an object by moving its probe tip across the object's surface and taking readings. Generally, the probe connects to a mechanical arm, and the system tracks the probe's position in space using angle measuring devices as the arm moves. The system calculates the position of the probe with coordinates known from the angle measuring devices.

Although mechanical systems scan with generally high accuracy, the rate at which a mechanical system acquires the data is relatively slow and can take several hours for scanning. A typical mechanical system measures only one point at a time, and no information is obtained about the material properties of the object such as its color.

As an alternative to mechanical systems, there are several types of optical object shape digitizers which fall into two basic categories: systems based on triangulation and alternative systems. A triangulation system projects beams of light on an object and then determines three-dimensional spatial locations for points where the light reflects from the object. Ordinarily, the light source is located at a certain distance from the light detector, and relative positions of the components and the direction of the light beam need to be known. A single dot system projects a single beam of light which, when reflected, produces a single dot of reflection. A scan line system sends a plane of light against the object which projects on the object on a line and reflects as a curvilinear-shaped set of points describing one contour line of the object. The location of each point in that curvilinear set of points can be determined by trigonometric triangulation.

Some single dot optical scanning systems use a linear reflective light position detector to read information about the object. In such systems a laser projects a dot of light upon the object. The linear reflected light position detector occupies a position relative to the laser which allows the determination of a 3D location for the point of reflection. A single dot optical scanner with a linear reflected light position detector can digitize only a single point at a time. Thus, a single dot optical scanning system, like mechanical system described above, is relatively slow in collecting a full set of points to describe an object. Single dot optical scanners are typically used for applications such as industrial engineering. The digitizing speed is usually limited by the mechanics of the scanning system, i.e., the moving and positioning of the laser beam. A scanning head can be mounted on a high-precision, but costly, positioning system to take a digitized image of the object's shape with generally good accuracy. However, because of the high cost, slow speed and difficulty of obtaining material properties such as colored texture, single dot optical scanners find generally only limited applications.

Scan line systems offer one solution to the speed bottleneck of single point triangulation system. Those systems typically employ a 2D imager, such as a charge coupled device (CCD) camera, for signal detection. The system projects a light plane (i.e., a laser stripe) instead of just one dot and read the reflection of multiple points depicting the contour of an object at a location that is at a distance from the CCD camera and from which the position can be triangulated. Some embodiments of the scan line-type system attach the CCD camera to a rotating arm or a moving platform. During scanning, either the object moves on a known path relative to the camera and laser, or the camera and laser, together, move around the object. In any case, such systems usually depend on this type of fixed rotational movement and typically use a bulky, high-precision mechanical system for positioning. Because of the use of mechanical positioning devices, resealing flexibility can be very limited, e.g., a scanner designed for objects the size of a basketball may not be useful for scanning apple-sized objects.

Some laser stripe triangulation systems currently available are further limited because the laser stripe stays at a fixed angle relative to the camera, and the system makes its calculations based on the cylindrical coordinates of its rotating platform. The mathematical simplicity in such a projection system complicates the hardware portion of these devices as they typically depend on the rotational platform mentioned. Also, the simplified geometry does not generally allow for extremely refined reproduction of topologically nontrivial objects, such as objects with holes in them (e.g., a tea pot with a handle). Full realization of triangulation scanning with a non-restrictive geometry has not been achieved in the available devices.

Apart from optical triangulation systems (single dot or structured line systems), there are alternative optical scanning systems which present a scanning solution different from those employing triangulation techniques. Range meters, depth-from-focus and multi-camera systems ate among those categorized as "alternative" systems. Range meter systems typically use a pulsed laser and mechanical scanning techniques to project a dot laser across then measure the time or phase delay of the reflected signal. As range meter systems typically incorporate a single dot method of data collection, they are intrinsic to single-point scanners, and they typically do not acquire material properties of the object.

Another type of alternative scanning system is a stereoscopic system which uses several CCD cameras located at known distances from each other. The captured images are processed with a pattern recognition system which finds matching points in different images of the object, thereby obtaining the shape/contour information. One advanced stereoscopic system uses 6 high-resolution CCD cameras. Since matching points can not be identified on flat and texture-less parts of the object a special grid needs to be projected on the object to facilitate geometry reconstruction. In spite of that, data omissions frequently occur, and thus the method is not very reliable since the quality depends on the material reflective properties.

In the depth-from-focus method two images of the object are acquired with cameras focused to focal planes located closer and further away than the object. By comparing the defocused images the depth information can be obtained. To facilitate the depth reconstruction a special checkerboard grid is typically projected on the object. The method suffers from the problems reverse to the problems of stereoscopic imaging: the objects with rich texture can not be reliably processed. Also, the technique, similar to the stereoscopy, results usually in low geometric quality of the data, while the equipment incorporates at least two cameras and a special light projector, i.e., it is rather complex.

Thus, for devices that scan, measure or otherwise collect data about the geometry and material properties of an object, it would be a substantial advance if a digitizer could be created that could rapidly gather accurate data concerning a 3D object. It would also be an advance if the device would be simple in manufacturing and would be based on one of the mass-produced hardware architectures such are digital camera chip sets. Another advance would be if the device would capture the texture image of the object and determine object's material properties such as diffuse and specular reflection coefficients. Furthermore, it would be an advance if the device has no moving parts.

SUMMARY OF THE INVENTION

It is an object of the present invention to provide a 3D measurement/digitizing system which is capable of rapid gathering of data relating to 3D profile of a measured object.

It is another object of the present invention to provide a 3D measurement/digitizing system which illuminates an object with a special kind of structured light pattern and records the shape of the reflected points of light by means of an image collector.

It is another object of the present invention to provide a 3D measurement/digitizing system which utilizes a triangulation technique that does not depend on the fixed direction of the light source relative to the camera.

It is another object of the present invention to provide a 3D measurement/digitizing system which includes a light projecting system that projects both structured light and uniform illumination light from the same apparent source or apparent location.

The present invention provides a high-speed, accurate and portable system and method for rapidly measuring objects and processing the shape, contour, color and material properties it collects for display, graphic manipulation, model building and other uses. Because the basic information about the object is obtained in rapid fashion, the invention is particularly suited to scan and measure objects which cannot easily stay motionless, such as human or animals. The mechanical and data processing features of the present invention permit the collected data to be processed with high accuracy and photo-realism.

The present invention also provides a system for illuminating an object with a special kind of structured light pattern, recording the shape of the reflected points of light by means of an image collector (such as a camera), and, by a triangulation technique that does not depend on the fixed direction of the light source relative to the camera, reconstructing the 3D shape of the object through a computer using the data points collected from the reflection of the structured light pattern. With the collected data points, a user can, inter alia, create, display and manipulate an image of the 3D object on a computer, physically reproduce the object (through computer controlled milling machines, stereolithography or digital holography), compress the data for easy transmission (such as over the Internet), or use the data in graphic manipulation systems (such as in 3D computer games).

The present invention also provides embodiments which are portable and can also be implemented using components which are readily available. A representative embodiment of the portable scanning system does not require a computer as part of the system because data processing contemporaneous with the data collection is obviated in this embodiment. Instead, the portable system stores in the storage media several images of the objects with different illumination patterns. The data is subsequently processed, at any desired time, by a computer system which applies data processing routines, i.e., the model building algorithms which provide 3D surface generation. It should be noted, however, processing of the data collected using the portable scanning system according to the present invention need not be limited to the specific data-processing routines described herein.

The digitization system according to the present invention utilizes the principle of optical, or geometrical, triangulation. While producing the quality of digitizing similar to the quality of laser-based triangulation sensors, the digitizer according to the present invention does not employ any moving parts, and it can be implemented completely with standard components of mass-produced digital cameras. The data acquisition according to the present invention is simplified to acquiring of only two or, optionally, four images of the object. Thus, the digitization speed is intrinsically superior to the scanning rate of laser-based scanners where a large number of images typically need to be acquired and processed.

Another feature of the present invention is that the light source projects both structured light and uniform illumination light from the same apparent source, and that allows for numerical normalization of the images. Such normalization increases consistency in quality of digitizing colored objects and also reduces the dependence on ambient light illumination.

An important feature of the structured light pattern according to the present invention is that the pattern consists of several stripes which have a linear slope of light intensity profile. During processing, not only the centers of the stripes are found, but also the data points are identified on the slopes of the stripes. The actual number of the stripes depends on the dynamic range of the camera. Thus the method utilizes not only pixel resolution of the camera, but also its dynamic-range for increasing the quality of digitization. Physically, 3D coordinates can be obtained for all pixels of the imager, i.e. it is not limited to the number of projected stripes.

According to the present invention, one or several stripes of the structured light pattern have different color than other stripes. Such a stripe can be easily distinguished from other stripes during image processing. Once such a stripe is identified, the data processing steps for obtaining the 3D profile of the scanned object follows the 3D-profile-generation algorithms used with the 3D scanning system described in U.S. patent application Ser. No. 08/620,689 filed on Mar. 21, 1996 by A. Migdal, M. Petrov and A. Lebedev, which application is explicitly incorporated herein by reference.

The present invention also provides a method of precise determination of material specular and diffusive reflection properties. It is made possible because the object is illuminated by spot-like light sources located at known distances from the camera.

BRIEF DESCRIPTION OF THE DRAWINGS

FIGS. 7a–7d illustrate various intermediate image processing results.

DETAILED DESCRIPTION OF THE INVENTION

Figure 1:
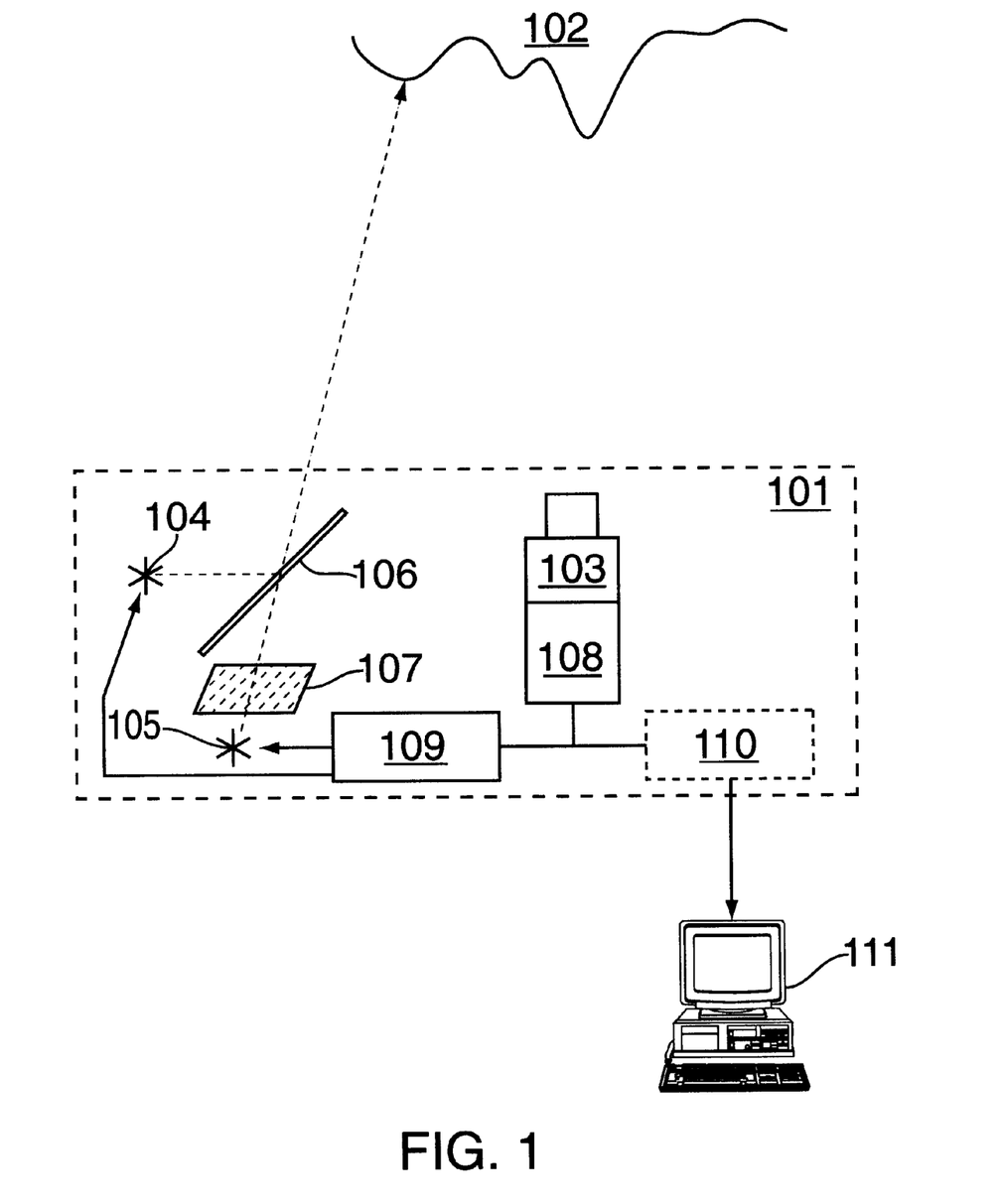
FIG. 1 illustrates a first exemplary embodiment of the portable 3D digitization system according to the present invention.
Figure 2A:
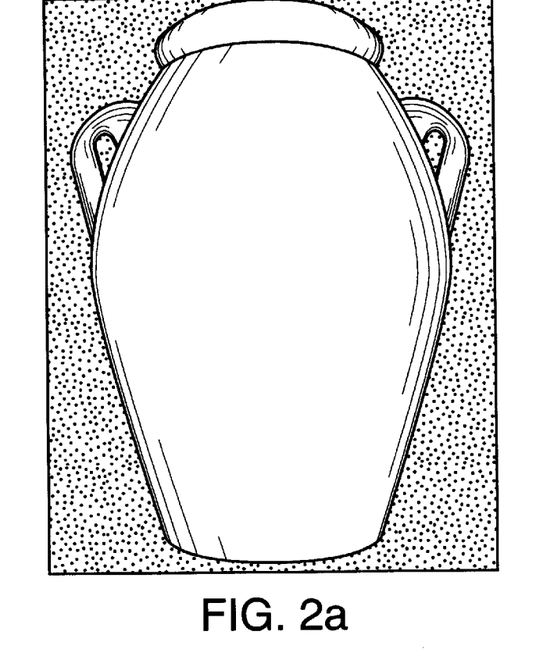
FIG. 2a illustrates images obtained with the exposure from flash 104 of FIG. 1.
Figure 2B:
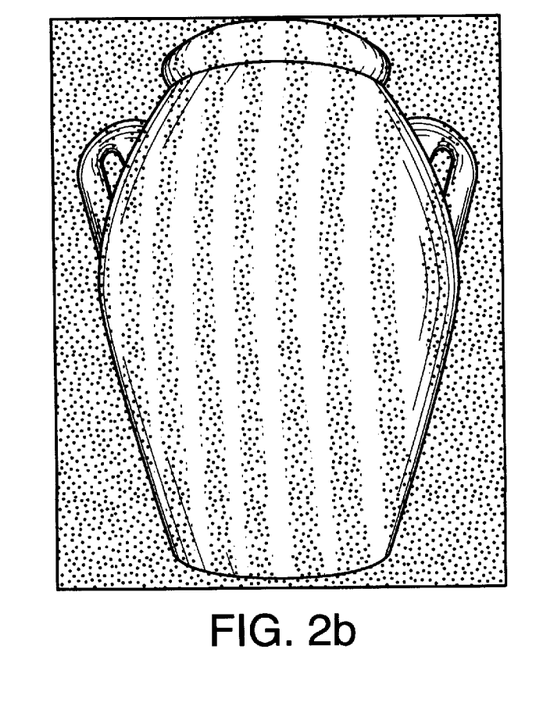
FIG. 2b illustrates images obtained with the exposure from flash 105.

As shown in FIG. 1, a basic embodiment of the structured light digitizer 101 according to the present invention includes a color digital camera 103, two photographic flashes 104 and 105, optical mask 107 and a semi-transparent mirror 106. The optical paths of the light emitted by the flashes 104 and 105 are combined by the semitransparent mirror 106. The light from the flash 104 is reflected from the mirror 105 upon the object 102. The light from the flash 105 passes through the mask 107, and through the semitransparent mirror 106 upon the object 102. The camera 103 acquires several images, including one image taken with the flash 104 and another image taken with the flash 105. A sample image taken with the exposure from flash 104 is shown in FIG. 2a, while the image with the exposure of flash 105 is shown in FIG. 2b.

The photographic flashes 104 and 105 are identical xenon flash tubes of small diameter and length, such as BGA 1013 type manufactured by EG&G Heimann (Montgomryville, Pa.). BGA 1013 has arc length 13 mm and internal diameter 1.75 mm. It is significant for the exemplary embodiment that the diameter of the arc in the flashes is smaller than the pitch of mask pattern. The arc length determines the resolution for determining the material properties of the object, as will explained later.

Figure 3:
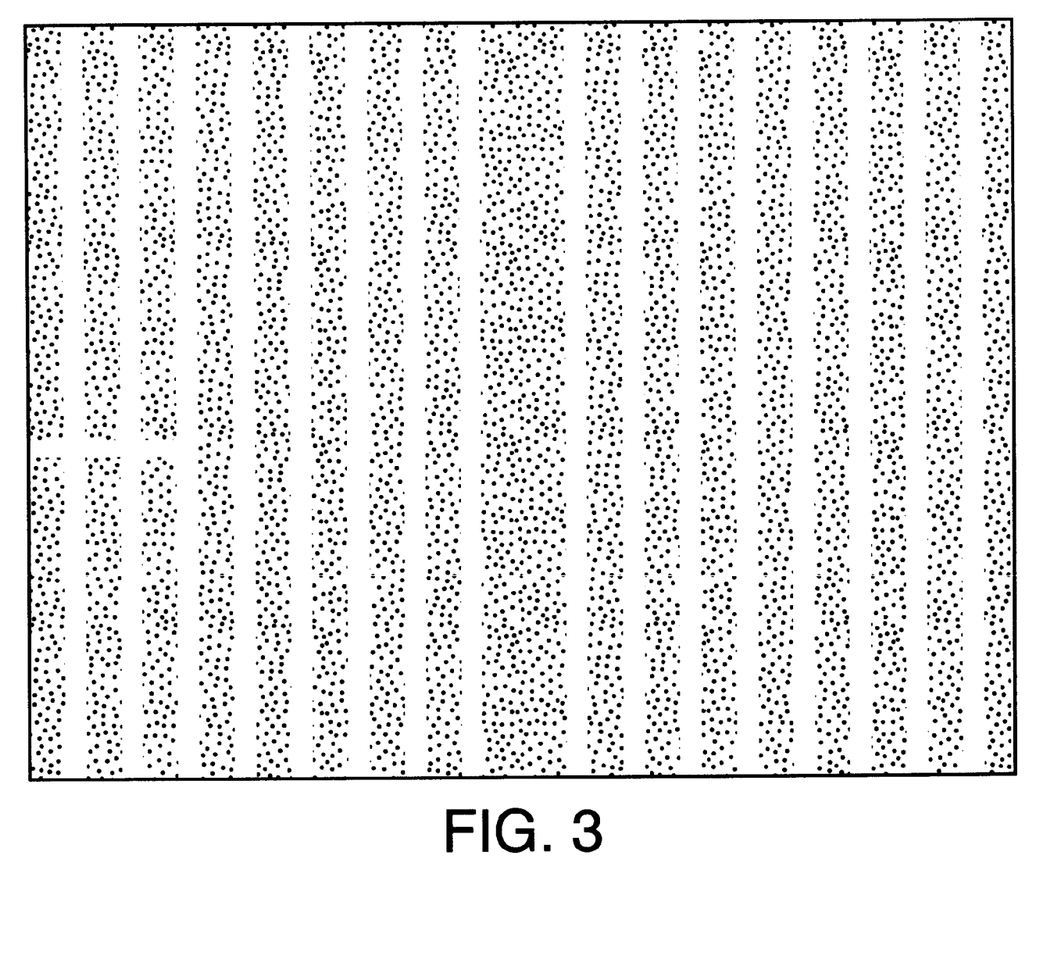
FIG. 3 illustrates an exemplary embodiment of the mask used for projecting structured light.
Figure 4A:
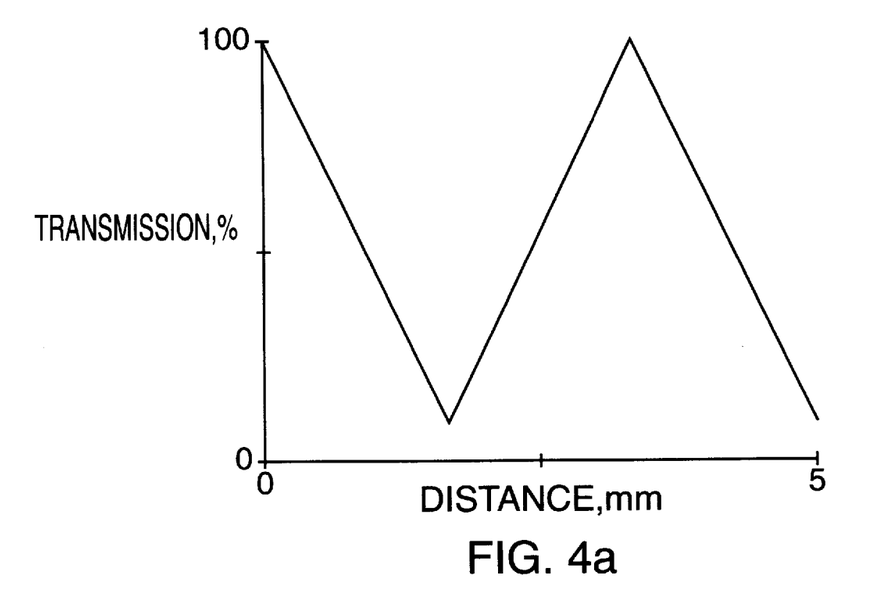
FIG. 4a illustrates the light transmission profile function of the mask.
Figure 4B:
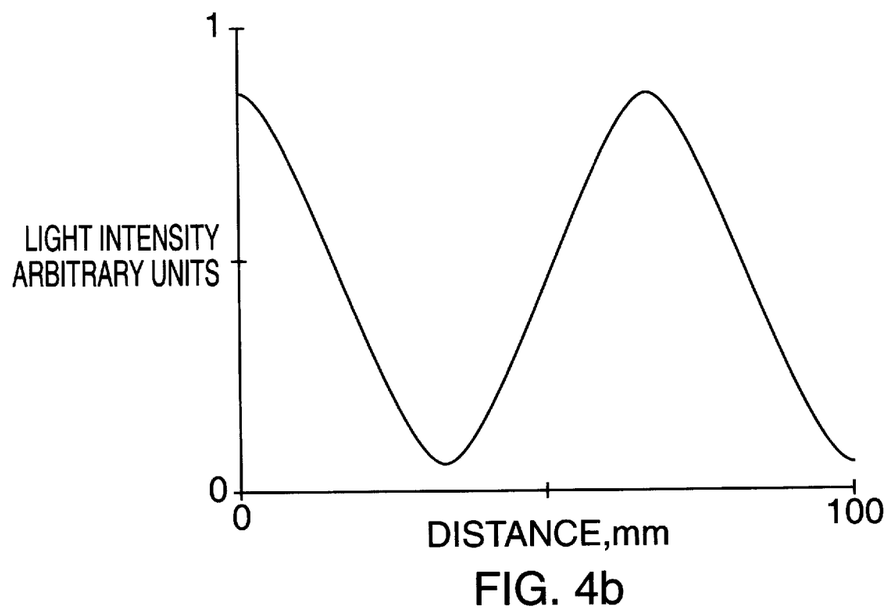
FIG. 4b illustrates the profile of light intensity distribution as projected with the flash through the mask, which profile of light intensity distribution is used for calibration of the digitizing system according to the present invention.

The optical mask 107 has a transmission pattern as illustrated in FIG. 3. It consists of stripes which have a gradual, e.g., linear, change of transmission from dark stripes to bright stripes, as shown in FIG. 4a. All stripes are gray, except for one or several lines, which are colored in a different color, e.g., magenta. The pattern might be printed using a high-resolution laser color printer on a thin glass substrate e.g., 50 micron thick glass sheets AF-45 manufactured by Schott (Germany). Alternatively, the mask can be manufactured by means of photographic replication on a large-format photographic film. For illustrative purposes the separation between the stripes might be 4 mm and the mask might be located at 30 mm distance from the flash 104. The flash tube might be considered as a spot light source, and light propagation from the flash might be assumed to follow the laws of geometrical optics, i.e., the flash directly projects the transmission pattern of the mask upon the object, resulting in the intensity pattern such as one shown in FIG. 4b. The contrast of projected stripes depends on a number of factors, including the diameter of the flash 104; the highest quality is achieved for smallest diameter flash tubes. The contrast of the projected pattern might be further improved if projection optics, e.g. a lens, is used for imaging the mask on the object.

The camera 103 of the exemplary embodiment is based on a color digital camera such as one built around a megapixel (about 1 million pixels) CCD detector, e.g. ICX085AK model from Sony Corp. ICX085AK is a progressive scanning sensor which contains 1300×1030 active pixels with 6.7 micrometer square pixel size. It has vertical resolution of 1024 TV-lines and can be completely read out 12 times per second. The design and basic functions of the digital camera electronics 108 are well known in the art and are not described in any detail here. An example of a mass-produced digital camera is Olympus D-600L. In addition to performing basic functions of mass-produced digital cameras, such as reading out and synchronizing the CCD chip, background subtraction, auto-exposure and auto-focus, the electronics 108 for the camera 103 of the present invention contains EEPROM type memory for storing calibrations parameters. The camera 103 acquires several images and stores them in the camera memory 110. Exemplary, the image memory 110 is dynamic RAM (Random Access Memory), such as 8-Megabit Toshiba TC59S6408BFT-10 RAM chips with 10 nanosecond access time, which is capable of storing the data at the rate of higher than 12 fill-resolution images per second. The flash synchronization electronics 109 is an electronic switch which turns one or the other flash on the command from the camera electronics 108.

During operation the camera is capable of acquiring both 2D and 3D images. When in 3D mode, the camera 103 turns flash 104 through synchronization module 109 and acquires the image to the memory 108. It then acquires the image with the flash 105. After the image acquisition is completed, the images are downloaded to the host computer 111 through any of the supported by the digital camera interfaces, e.g. serial USB (Universal Serial Bus) or RS232 ports. Alternatively, the images can be stored directly to the memory of the host computer bypassing the memory module 110. It is important for successful 3D reconstruction that the brightness of the flashes is substantially higher than the brightness of the ambient lighting.

Figure 5:
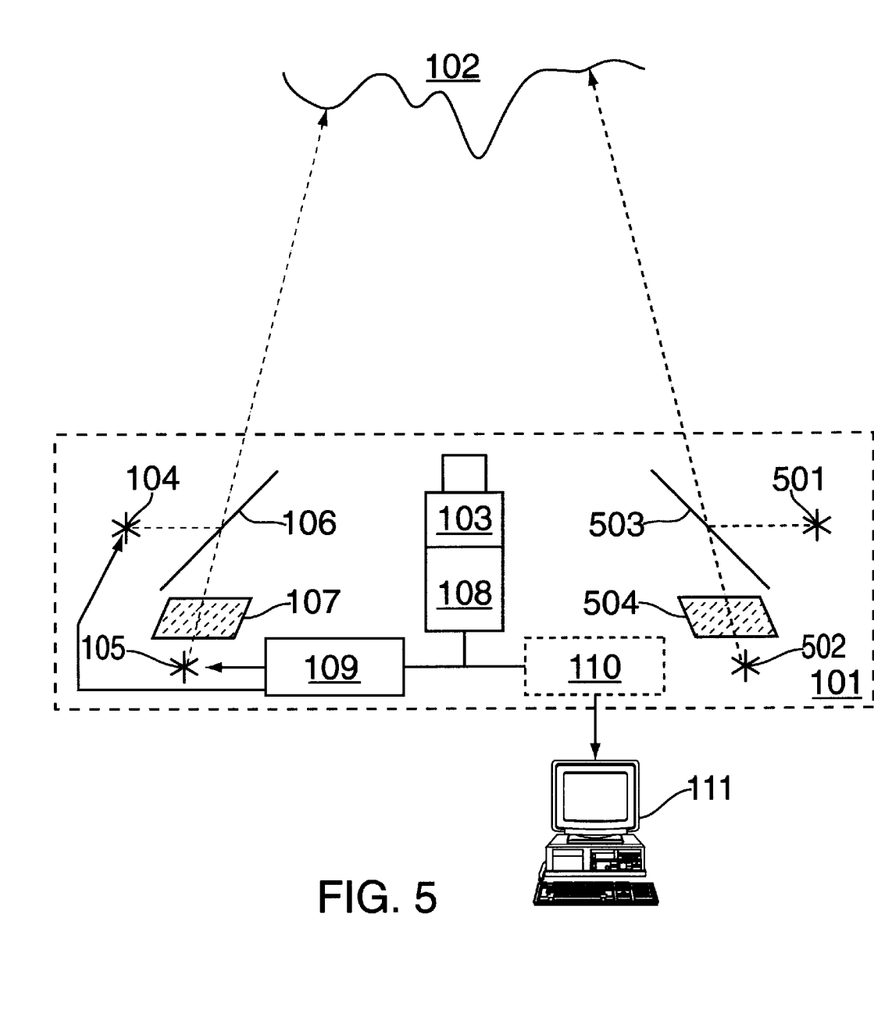
FIG. 5 illustrates a second exemplary embodiment of the 3D digitization system according to the present invention which includes structured light projector consisting of four spot light sources.

Alternative embodiment of the 3D digitization system is demonstrated in FIG. 5. This embodiment is identical to the embodiment described above except it has two structured light projectors which are symmetrically located on the sides of the camera. During operation the camera acquires 4 images taken sequentially with all for four flash tubes 104, 105, 501 and 502.

Since up to 4 images are required to be obtained, and the camera image acquisition time is 1/12 sec, the digitizing time is about 1/3 sec for the embodiment of FIG. 5 and 1/6 sec for the embodiment of FIG. 1.

A. Image Processing

Figure 6:
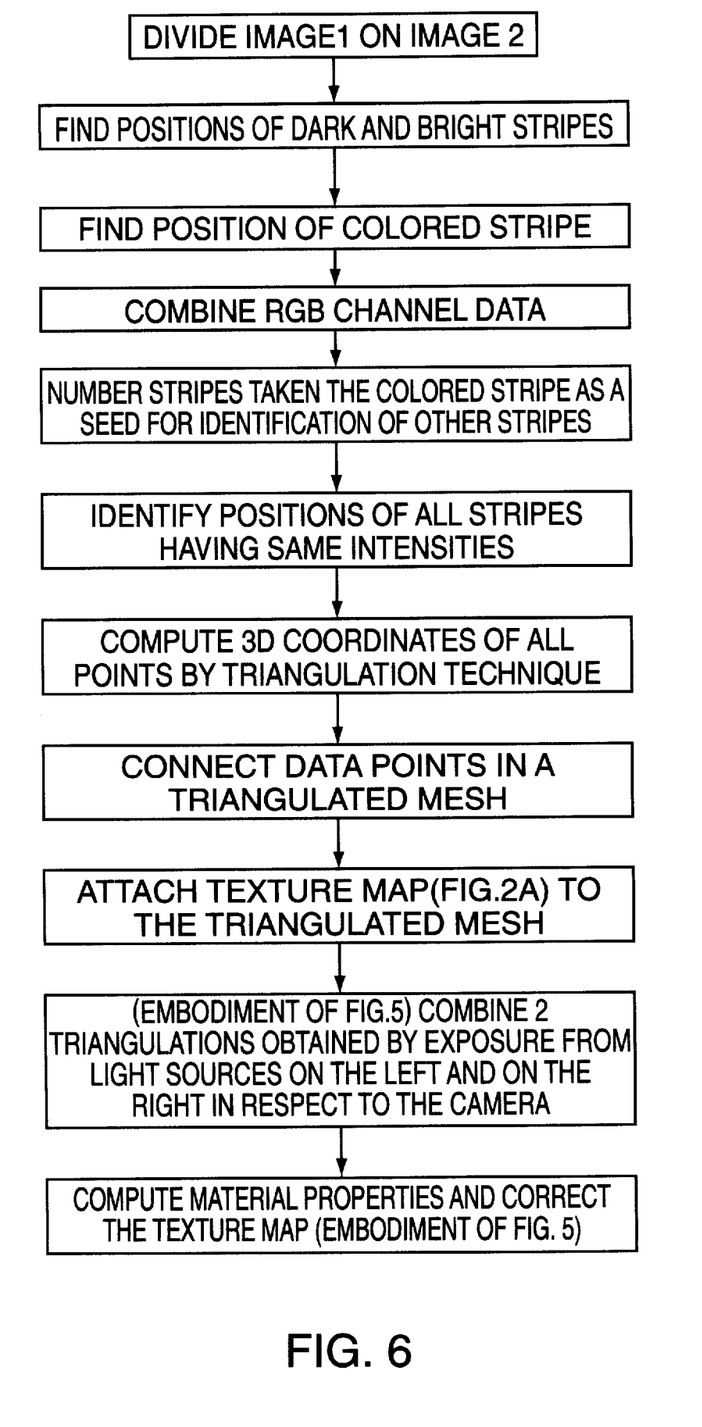
FIG. 6 illustrates an exemplary flow chart of data processing for 3D surface reconstruction.

The data processing steps for obtaining the 3D profile, which data processing may be performed in the host computer, consists of the steps described below and shown in the flowchart of FIG. 6. The processing steps are similar for embodiments shown in FIG. 1 and FIG. 5 except for steps 10–11 which are only applicable for the embodiment shown in FIG. 5.

Figure 7A:
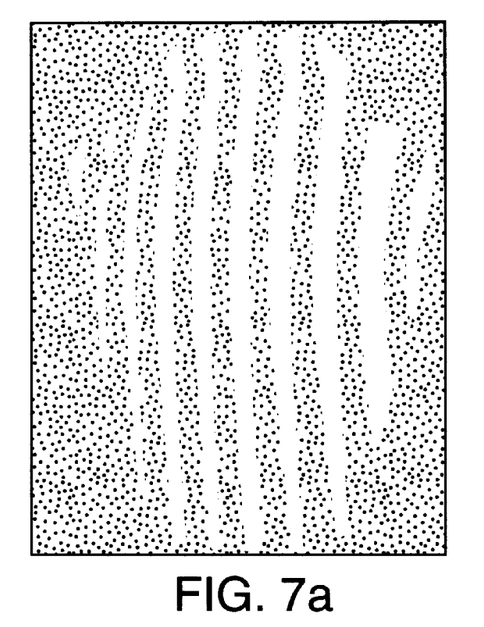
FIG. 7a is the image obtained by division of image FIG. 2a by the image FIG. 2b.

Step 1. The red, green and blue (RGB) components of the image such as FIG. 2b are divided by RGB components of the image FIG. 2b. The obtained result is a RGB image which contains the information about the modulation (FIG. 7a).

Figure 7B:
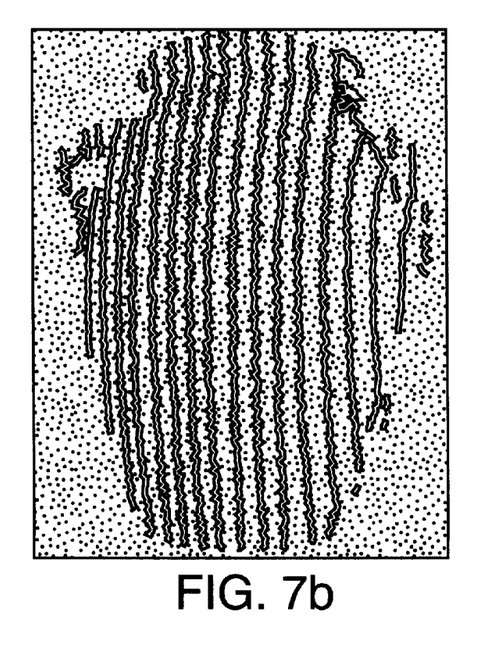
FIG. 7b shows bright and dark stripes identified.

Step 2. The image of FIG. 7a is passed through a digital filtering algorithms which locates with sub-pixel precision the position of the dark and bright lines on the image. The processing is done separately in three channels RGB. Th result in a sample channel such as green is shown in FIG. 7b.

Figure 7C:
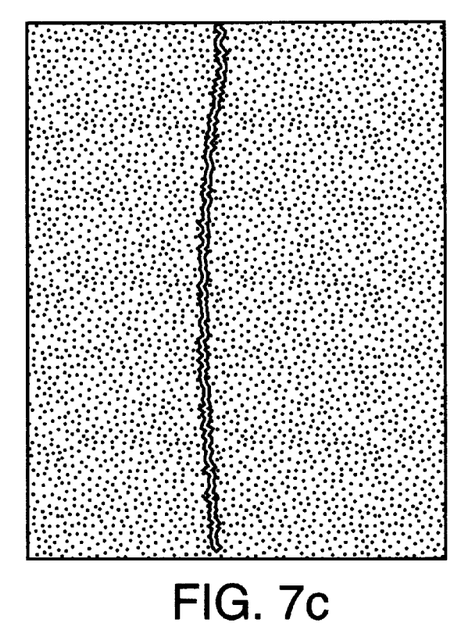
FIG. 7c shows the central stripe identified.

Step 3. The intensities of the obtained lines in RGB channels are compared between each other. In the exemplary embodiment the central line of the mask has magenta color. The magenta color mask transmits light in red and in blue, but absorbs green color. Thus in the region which is illuminated by the magenta stripe the green channel intensity is reduced, and the colored line location is determined. The identified colored stripe is shown in FIG. 7c.

Step 4. RGB channels are numerically added together to produce a single modulation pattern.

Figure 7D:
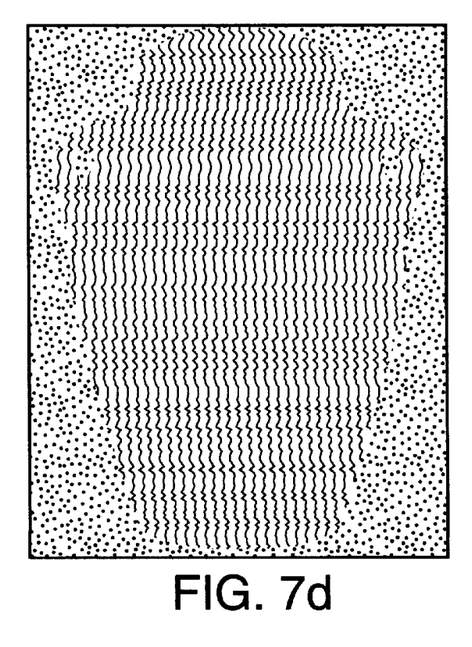
FIG. 7d shows lines with same intensity determined within the stripes.

Step 5. Since one of the stripes is located during processing step 3, other stripes can be identified and numbered as shown in FIG. 7d. This is accomplished by the algorithm which goes across all pixels along a horizontal line of the camera image, and counts the stripes beginning with the already identified stripe. Frequently, however, the stripes might break and or be partially omitted on black or not reflective surfaces. An algorithm for robust stripe identification is described in U.S. patent application Ser. No. 08/620,689 filed on Mar. 21, 1996 by A. Migdal, M. Petrov and A. Lebedev, which application has been incorporated herein by reference. This application describes a multiple line scanning system wherein several light stripe are projected on the object, and a method for line identification of those light stripes.

Figure 8:
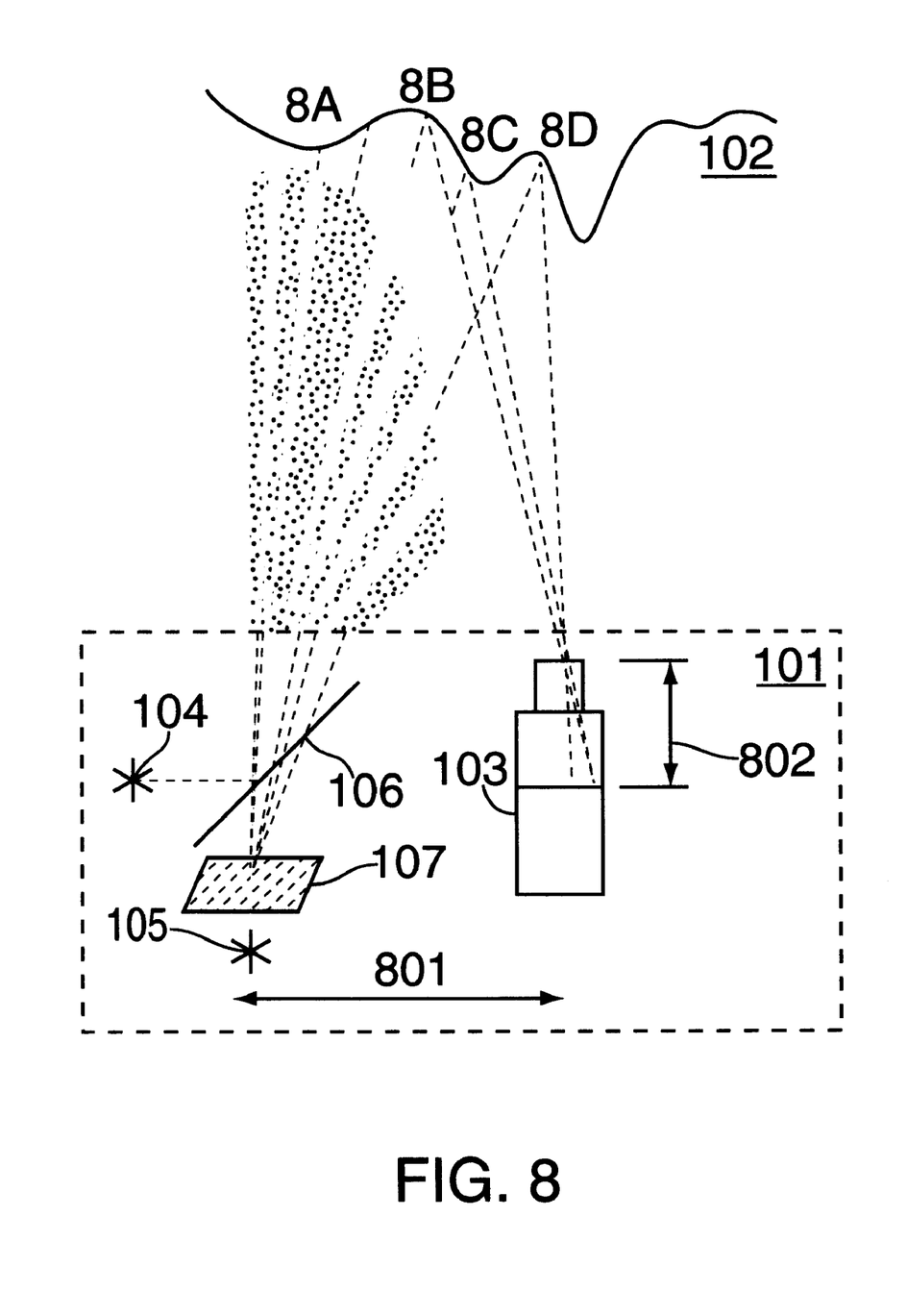
FIG. 8 illustrates some of the geometric relationships among various components of the first embodiment.

Step 6. On the image of FIG. 7d all lines are shown which have the same intensity on FIG. 7a. Typically, up to 50 additional lines can be identified between the stripes. The total number of lines depends on the material properties of the object and on the dynamic range of the camera. Typical cameras, such as those based on Sony's ICX085AK sensor, are 8-bit cameras, meaning that the camera is capable of distinguishing of 256 shades of each R,G,B color. Practically, only about 50 shades of color can be detected due to the noise of the sensor and its read-out electronics. The number of possible color gradations is further reduced if the object is not uniformly colored and contains bright and dark parts. Modern digital cameras such as those built around Sony's ICX085AK sensor are capable of automatic adjustment Step 7. After the stripes are identified their 3D coordinates can be determined in a trigonometric triangulation, as illustrated in FIG. 8. The basics of triangulation are explained in detail in U.S. patent application Ser. No. 08/620,689. The geometric parameters of the system such as the distance between the light source and the camera 103, at angles under which the light stripes are emitted, are known from the design of the system or determined in a calibration process. The calibration data, which may be contained in camera electronics 108, consists of, exemplarily but not exclusively, triangulation distance 801, focal length of the camera's lens 802, pixel size of the camera's sensor, and angular positions of the stripes 8A–8D. Also contained in the calibration data is a slope profile of the light-source intensity, such as the intensity function shown FIG. 4b. Firstly, the geometry of the object is determined with low resolution by finding the 3D coordinates of stripe shown in FIG. 7b (about 20 stripes). Secondly, the 3D coordinates are computed for all stripes identified during step 6. The total number of stripes is about 500 which corresponds to the total number of 3D points of up to 500×1024 (resolution of the sensor ICX085AK), or about 500,000.

Step 8. The 3D data points are connected into a triangulated mesh using, for example, the meshing algorithm described in U.S. patent application Ser. No. 08/620,689 filed on Mar. 21, 1996 by A. Migdal, M. Petrov and A. Lebedev.

Step 9. The image of obtained with the exposure from flash 104, such as the image shown in FIG. 2a, is placed on top of the 3D mesh obtained above in step 8.

Step 10. For the embodiment of the present invention illustrated in FIG. 5, steps 1–9 are repeated for two images obtained with the exposure from flashes 501 and 502. Then, a second set of 3D data points is obtained and triangulated. Two triangulated data sets are combined in one to produce a single triangulated data set for the whole object.

Step 11. Next, for the embodiment of the present invention illustrated in FIG. 5, material properties of the object are found for the object. It is essential for finding the material properties that the geometry of the object is known through steps 1–10, and the two texture images of the object are obtained by the exposure of spot light sources such as photographic flash tubes. The size of the flash tubes is considerably smaller than the distance between the digitization system and the object. Under these conditions the calculations can be performed as following:

The Torrance-Sparrow model is assumed for representing the diffusive and specular reflection components of the object. Numerically, the model can be written as:

$$I_m = K_{D,m} \cdot \cos \theta_i + K_{S,m} \cdot \frac{1}{\cos \theta_r} \cdot e^{-\alpha^2 2\sigma^2};$$

where m corresponds to the three colors red (R), green (G), and blue (B). $I_m$ is the apparent light intensity of the texture point on the surface of the object. $\theta_i$ is the angle between the surface normal of the 3D geometry and the light surface direction from the flash to the point on the object; $\theta_r$ is the angle between the surface normal and the viewing direction, i.e. direction from the camera to the point on the object; $\alpha$ is the angle between the surface normal and the bisector of the light source direction and the viewing direction; $K_{D,m}$ and $K_{S,m}$ are constants for the diffuse and specular reflection components, and $\sigma$ is the standard deviation of a facet slope of the Torrance-Sparrow model which is the roughness of the surface.

By comparing the images obtained by the exposure from flashes 104 and 502 the coefficients of the Torrance-Sparrow model can be trivially computed. Using the found coefficients the texture of the object can be reconstructed such as to be corrected for reflection of the flashes. The found texture has uniform illumination across the whole surface of the object. The Torrance-Sparrow coefficients are stored in the same file as the 3D model and are used later through the formula above for computing the actual look of the model in 3D-model browser.

While specific, exemplary embodiments have been described above, it should be readily apparent to those of ordinary skill in the art that the above-described embodiments are exemplary in nature since various changes may be made thereto without departing from the teachings of the invention, and the preferred embodiments should not be construed as limiting the scope of protection for the invention as set forth in the appended claims.

We claim:

1. A system for determining a three dimensional profile of an object comprising:

a first light-source unit configured to project a structured light pattern on the object and configured to uniformly illuminate the object; and an image-detecting device configured to detect a sequence of images, the sequence of images including at least one structured light pattern image and at least one uniform illumination image;

wherein said structured light pattern comprises a plurality of light stripes, having a gradual variation in intensity of light, and wherein said image-capturing device is located relative to said first light-source unit at a known position, and wherein depth coordinates corresponding to two-dimensional coordinates of detected light stripes in each image are calculable by triangulation based on an angle of approach of each of said light stripes onto said object, whereby a plurality of three-dimensional coordinates representative of said three-dimensional profile of said object are determined.

2. The system according to claim 1, wherein said plurality of light stripes comprises light stripes of at least two different colors.

3. The system according to claim 2 further comprising a second light-source unit located symmetrically opposite to said first light-source unit and having a positional relationship with respect to said detector which mirrors the positional relationship between said first light-source unit and said detector.

4. The system according to claim 3, wherein said structured light pattern and light to uniformly illuminate the object are emitted from the same apparent optical source position.

5. A system for determining a three dimensional profile of an object comprising:

a first light-source unit for projecting a structured light pattern and a uniform illumination pattern for illumination of the object;

a second light-source unit located symmetrically opposite to said first light-source unit and having a positional relationship with respect to said detector which mirrors the positional relationship between said first light-source unit and said detector; and an image-detecting device for detecting a sequence of images containing at least one of a structured light pattern image and a uniform illumination pattern image;

wherein said structured light pattern comprises a plurality of light stripes each having a gradual variation in intensity of light, and wherein said image-capturing device is located relative to said first light-source unit at a known position, and wherein depth coordinates corresponding to two-dimensional coordinates of detected light stripes in each image are calculable by triangulation based on an angle of approach of each of said light stripes onto said object, whereby a plurality of three-dimensional coordinates representative of said three-dimensional profile of said object are determined, wherein said plurality of light stripes comprises light stripes of at least two different colors, wherein said structured light pattern and uniform illumination pattern are emitted from the same apparent optical source position, and wherein said first light-source unit and said second light-source unit each comprises two photographic flashes, and wherein said structured light pattern and said uniform illumination pattern are combined through a semitransparent mirror for each of said first light-source unit and said second light-source unit.

6. A system for determining a three dimensional profile of an object comprising:

a first light-source unit for projecting a structured light pattern and a uniform illumination pattern for illumination of the object;

a second light-source unit located symmetrically opposite to said first light-source unit and having a positional relationship with respect to said detector which mirrors the positional relationship between said first light-source unit and said detector; and an image-detecting device for detecting a sequence of images containing at least one of a structured light pattern image and a uniform illumination pattern image;

wherein said structured light pattern comprises a plurality of light stripes each having a gradual variation in intensity of light, and wherein said image-capturing device is located relative to said first light-source unit at a known position, and wherein depth coordinates corresponding to two-dimensional coordinates of detected light stripes in each image are calculable by triangulation based on an angle of approach of each of said light stripes onto said object, whereby a plurality of three-dimensional coordinates representative of said three-dimensional profile of said object are determined, wherein said plurality of light stripes comprises light stripes of at least two different colors, wherein said structured light pattern and uniform illumination pattern are emitted from the same apparent optical source position, and wherein the image containing the structured light pattern is normalized by using the image containing uniform illumination pattern.

7. A system for determining a three dimensional profile of an object comprising:

a first light-source unit for projecting a structured light pattern and a uniform illumination pattern for illumination of the object; and an image-detecting device for detecting a sequence of images containing at least one of a structured light pattern image and a uniform illumination pattern image;

wherein said structured light pattern comprises a plurality of light stripes each having a gradual variation in intensity of light, and wherein said image-capturing device is located relative to said first light-source unit at a known position, and wherein depth coordinates corresponding to two-dimensional coordinates of detected light stripes in each image are calculable by triangulation based on an angle of approach of each of said light stripes onto said object, whereby a plurality of three-dimensional coordinates representative of said three-dimensional profile of said object are determined, wherein said plurality of light stripes comprises light stripes of at least two different colors, and wherein said first light-source unit comprises two photographic flashes, and wherein said structured light pattern and said uniform illumination pattern are combined through a semitransparent mirror.

8. A system for determining a three dimensional profile of an object comprising:

a first light-source unit for projecting a structured light pattern and a uniform illumination pattern for illumination of the object;

a second light-source unit located symmetrically opposite to said first light-source unit and having a positional relationship with respect to said detector which mirrors the positional relationship between said first light-source unit and said detector; and an image-detecting device for detecting a sequence of images containing at least one of a structured light pattern image and a uniform illumination pattern image;

wherein depth coordinates corresponding to two-dimensional coordinates of detected light stripes in each image are calculable by triangulation based on an angle of approach of each of said light stripes onto said object, whereby a plurality of three-dimensional coordinates representative of said three-dimensional profile of said object are determined, and wherein said first light-source unit and said second light-source unit each comprises two photographic flashes, and wherein said structured light pattern and said uniform illumination pattern are combined through a semitransparent mirror for each of said first light-source unit and said second light-source unit.

9. A system for determining a three dimensional profile of an object comprising:

a first light-source unit for projecting a structured light pattern and a uniform illumination pattern for illumination of the object;

an image-detecting device for detecting a sequence of images containing at least one of a structured light pattern image and a uniform illumination pattern image;

wherein said structured light pattern comprises a plurality of light stripes, and wherein depth coordinates corresponding to two-dimensional coordinates of detected light stripes in each image are calculable by triangulation based on an angle of approach of each of said light stripes onto said object, whereby a plurality of three-dimensional coordinates representative of said three-dimensional profile of said object are determined;

wherein the image containing the structured light pattern is normalized by using the image containing uniform illumination pattern.

10. A system for determining a three dimensional profile of an object comprising:

a first light-source unit for projecting a structured light pattern and a uniform illumination pattern for illumination of the object; and an image-detecting device for detecting a sequence of images containing at least one of a structured light pattern image and a uniform illumination pattern image;

wherein said structured light pattern comprises a plurality of light stripes, and wherein depth coordinates corresponding to two-dimensional coordinates of detected light stripes in each image are calculable by triangulation based on an angle of approach of each of said light stripes onto said object, whereby a plurality of three-dimensional coordinates representative of said three-dimensional profile of said object are determined, wherein said first light-source unit comprises two photographic flashes, and wherein said structured light pattern and said uniform illumination pattern are combined through a semitransparent mirror.

11. A method for determining a three dimensional profile of an object, comprising:

projecting a structured light pattern on an object, the structured light pattern including a plurality of stripes;

capturing a structured light pattern image of the object;

uniformly illuminating the object;

capturing a uniform illumination image of the object;

determining three-dimensional coordinates representative of the three-dimensional profile of the object as a function of the structured light pattern image; and determining a texture of the object as a function of at least the uniform illumination image.

12. The method according to claim 11, further comprising:

determining a model of the object using the three-dimensional coordinates and the texture of the object.

13. The method according to claim 12, further comprising:

displaying the model on a display device.

14. The method according to claim 11, wherein each one of the light stripes has a gradual variation of light intensity within the one of the light stripes.

15. The method of claim 11, wherein said plurality of light stripes comprises light stripes of at least two different colors.

16. The method of claim 11, further comprising:

normalizing the structured light pattern image using the uniform illumination image.

17. The method of claim 11, wherein the projecting the structured light pattern step includes projecting the structured light pattern from the same apparent optical source as that which uniformly illuminates the object.

18. A method for determining a three dimensional profile of an object using an image capturing device located at a known position relative to two light sources comprising:

capturing a first image of the object while a structured light pattern including a plurality of light stripes is projected on the object from the first light source;

capturing a second image of the object while a uniform illumination pattern is projected on the object from the first light source;

capturing a third image of the object while a structured light pattern including a plurality of light stripes is projected on the object from the second light source;

capturing a fourth image of the object while a uniform illumination pattern is projected on the object from the second light source;

calculating, by triangulation based on an angle of approach of each of said light stripes, depth coordinates corresponding to two-dimensional coordinates of detected light stripes in the first and third captured images; and determining a plurality of three-dimensional coordinates representative of said three-dimensional profile of said object based on the two-dimensional coordinates of light stripes in the first and third captured images and corresponding calculated depth coordinates.

19. The method of claim 18, wherein said plurality of light stripes comprises light stripes of at least two different colors.

20. The method of claim 18, further comprising:
   normalizing the first captured image using the second captured image.

21. The method of claim 18, further comprising:
   reconstructing a texture of the object based on the second and fourth captured images.

22. The method of claim 21, wherein the reconstructing step is performed using the Torrance-Sparrow model.

* * * * *

UNITED STATES PATENT AND TRADEMARK OFFICE
CERTIFICATE OF CORRECTION

PATENT NO. : 6,549,288 B1
DATED : April 15, 2003
INVENTOR(S) : Alexander Migdal et al.

It is certified that error appears in the above-identified patent and that said Letters Patent is hereby corrected as shown below:

<u>Title page,</u>
Item [57], ABSTRACT, please delete:

"The present invention provides a system for illuminating an object with a special kind of structured light pattern, recording the shape of the reflected points of light by means of a camera, and, by a triangulation technique that does not depend on the fixed direction of the light source relative to the camera, reconstructing the 3D shape of the object through a computer using the data points collected from the reflection of the structured light pattern. The scanning system is portable and does not require data processing contemporaneous with the data collection. The portable system stores in the storage media several images of the objects with different illumination patterns. The data is subsequently processed, by a computer system which applies data processing routines, i.e., the model building algorithms which provide 3D surface generation. The data acquisition according to the present invention is simplified to acquiring of only two or, optionally, four images of the object, thereby significantly increasing the digitization speed over that of laser-based scanners. The light source projects both structured light and uniform illumination light from the same apparent source, and that allows for numerical normalization of the images."

UNITED STATES PATENT AND TRADEMARK OFFICE
CERTIFICATE OF CORRECTION

PATENT NO. : 6,549,288 B1
DATED : April 15, 2003
INVENTOR(S) : Alexander Migdal et al.

It is certified that error appears in the above-identified patent and that said Letters Patent is hereby corrected as shown below:

Title page (cont'd),
and insert:

--An example system is described for illuminating an object with a structured light pattern, recording the shape of the reflected points of light by means of a camera, and, by a triangulation technique that does not depend on the fixed direction of the light source relative to the camera, reconstructing the 3D shape of the object through a computer using the data points collected from the reflection of the structured light pattern. The example system may be portable may stores several images of the objects with different illumination patterns. The data may be subsequently processed, by a computer system which applies data processing routines, i.e., the model building algorithms which provide 3D surface generation. The light source projects both structured light and uniform illumination light from the same apparent source, and that allows for numerical normalization of the images.--

Signed and Sealed this

Ninth Day of August, 2005

JON W. DUDAS
*Director of the United States Patent and Trademark Office*